Jan. 22, 1929.  1,699,926
H. A. SEUME
STREET INTERSECTION TRAFFIC MIRROR
Filed Oct. 11, 1926   2 Sheets-Sheet 1
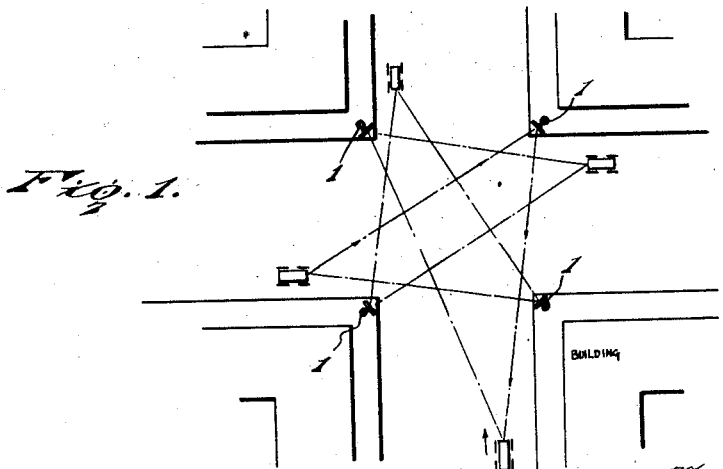
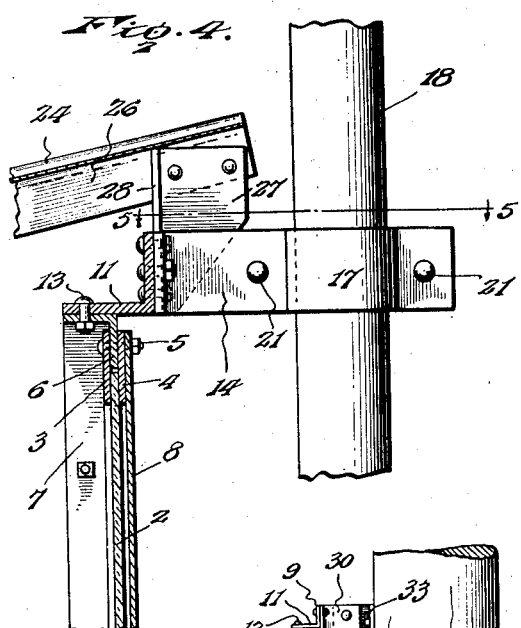
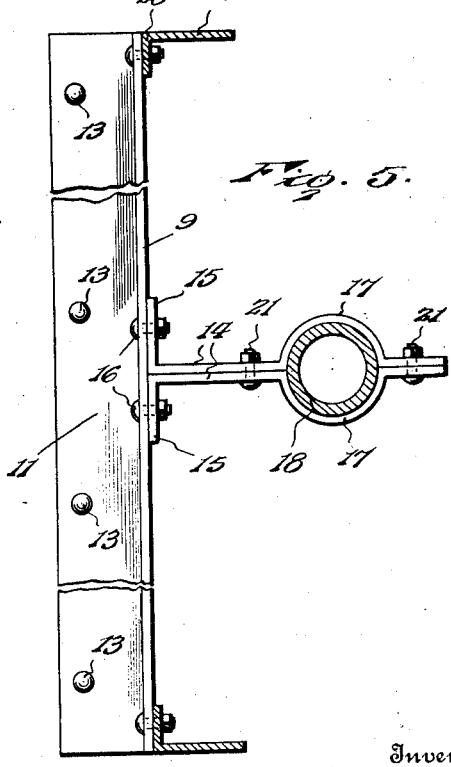
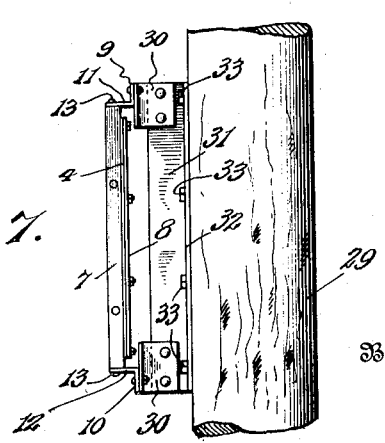
Inventor
H. A. Seume.
By Lacey & Lacey, Attorneys Jan. 22, 1929. 1,699,926
H. A. SEUME
STREET INTERSECTION TRAFFIC MIRROR
Filed Oct. 11, 1926 2 Sheets-Sheet 2
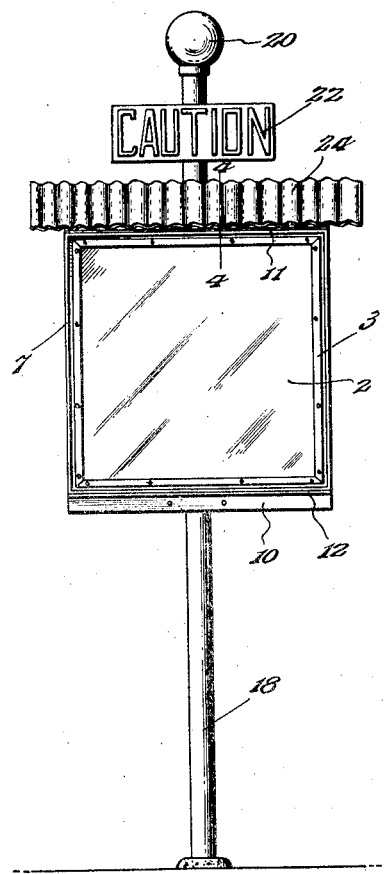
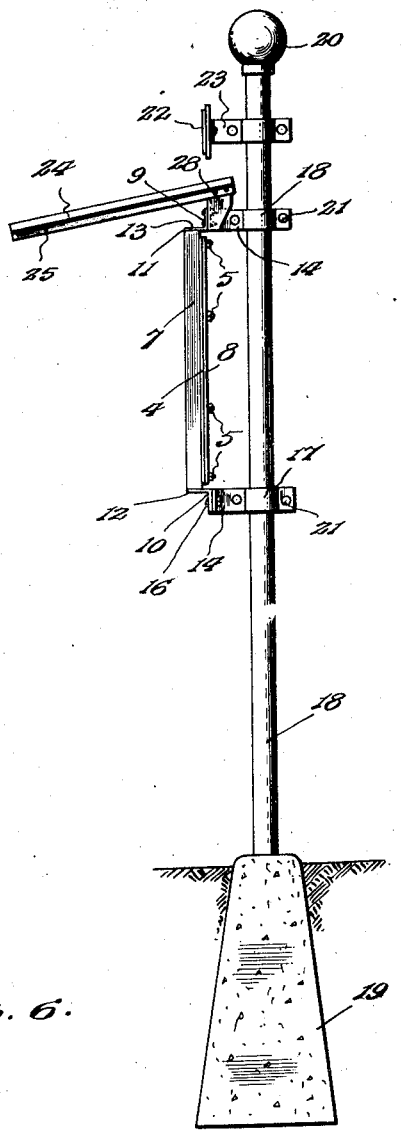
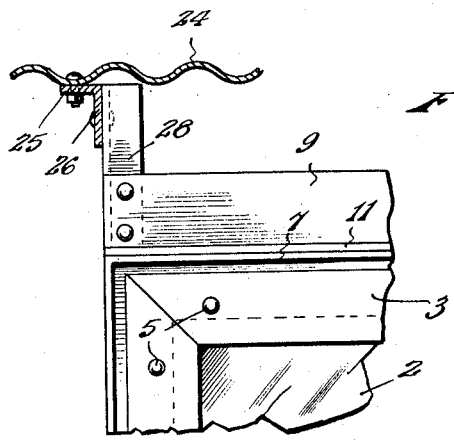
Inventor
H. A. Seume.

Patented Jan. 22, 1929.

1,699,926

UNITED STATES PATENT OFFICE.

HERMAN A. SEUME, OF OMAHA, NEBRASKA, ASSIGNOR OF ONE-THIRD TO PETER B. BENTZ, AND ONE-THIRD TO WALLACE A. WEIGEL, BOTH OF OMAHA, NEBRASKA.

STREET-INTERSECTION TRAFFIC MIRROR.

Application filed October 11, 1926. Serial No. 140,871.

This invention relates to traffic mirrors and more particularly to a mirror adapted to be erected at a street intersection so that the driver of an automobile or other vehicle approaching the street intersection may observe other machines approaching the intersection from a cross street and, in his turn, also be observed, and thereby eliminate the danger of collisions. At the present time, collisions often occur at street intersections, due to the fact that buildings at the corners obstruct the view of an intersecting street and a driver is not aware of the fact that another machine is approching the intersection along the cross street until both machines have reached and started to cross the intersection.

One object of the invention is to provide a mirror which may be mounted upon a building or supporting post at a street intersection and adjusted so that it will be disposed at the proper angle for observation by the drivers of automobiles moving along intersecting streets.

Another object of the invention is to prevent rays of sunlight from striking the mirror and causing a blinding light to be thrown off and also prevent snow or frozen rain from accumulating upon the face of the mirror.

Another object of the invention is to provide the mirror with a very strong frame to which plates carrying the shield and support engaging means may be attached without the frame being subjected to excessive strain.

The invention is illustrated in the accompanying drawings, wherein:

Figure 1 is a diagrammatic view of a street intersection at which the improved mirrors have been erected.

Figure 2 is a view showing one of the mirrors in front elevation.

Figure 3 is a side elevation of the mirror.

Figure 4 is an enlarged fragmentary sectional view taken along the line 4—4 of Figure 2.

Figure 5 is a transverse sectional view taken along the line 5—5 of Figure 4.

Figure 6 is a fragmentary view showing a portion of the mirror partly in front elevation and partly in section.

Figure 7 is a side elevation showing a modified form of support engaging means.

The mirror constituting the subject matter of this invention is intended for use at a street intersection such as shown in Figure 1, and, in practice, the mirrors, which are indicated in this figure by the numeral 1, will be erected one at each corner of the intersecting streets. Each mirror is disposed diagonally of the street corner at which it is mounted for observation by the drivers of automobiles approaching the intersection along the intersecting streets. The mirrors are of duplicate construction and, therefore, only one will be described in detail.

The reflector 2, which is preferably silvered glass such as ordinarily used in making mirrors, is preferably rectangular and of suitable dimensions so that it may be easily seen by the driver of an approaching automobile. Front and rear bordering sheets 3 and 4 which are open extend about the margins of the reflector 2 and are secured in gripping engagement with the front and rear faces thereof by bolts or other suitable fasteners 5 which also pass through the inwardly extending flange 6 of the bordering rim 7. The rim 7 which is formed of angle metal extends entirely about the frame formed by its flange 6 and the bordering sheets 3 and 4, and projects forwardly. A backing sheet 8 fits against the rear of the frame in covering relation to the reflector and is secured by the bolts 5, as clearly shown in Figure 4. It will thus be seen that a mirror is provided having a frame which will be very strong and capable of being subjected to strains by high winds or other forces without danger of being bent and breaking the reflector 2. It should also be noted that since the flange 6 of the rim 7 extends between the bordering sheets 3 and 4 it constitutes a filler which limits movement of the sheets towards each other and the bolts can be tightened without danger of breaking the mirror.

Angle bars 9 and 10, which extend transversely of the frame, are disposed above and below the same with their flanges 11 and firmly secured to the rim 7 by bolts or other suitable fasteners 13. Clamps are carried by the plates 9 and 10 and each preferably consists of companion strips 14 having their forward end portions bent to form attaching seats 15 which are firmly secured to the plates by bolts or other suitable fasteners 16. The strips 14 extend rearwardly from the angle bars 9 and are bent to form jaws 17 adapted to fit about an upright standard 18 erected at the corner of intersecting sidewalks. The standard 18 preferably consists of a hollow pipe formed of strong metal and having its lower end embedded in a cement foundation 19 and, at its upper end, carrying a light 20 which may be energized by electric wires passed upwardly through the hollow standard. By referring to Figure 5, it will be seen that when the securing bolts 21 are loosened, the mirror may be swung circumferentially of the standard until it is disposed at the proper angle with respect to the intersecting streets and the bolts then tightened to securely hold it in the set position. A caution sign 22, which is provided with a clamp 23 similar to the clamps carried by the angle bars 9 and 10, may be secured to the standard above the mirror.

In order to shield the mirror from the sun and prevent rain and snow from striking the reflector and preventing it from functioning properly during cold weather, there has been provided a shield or roof 24 formed of sheet metal and preferably corrugated so that rain water will flow along it in the desired direction. The shield is disposed above the frame and extends forwardly therefrom at a downward incline. Strips 25, which are formed of angle metal to provide depending side flanges 26, are secured against the under face of the shield and have the rear end portions of their depending side flanges riveted or otherwise firmly secured to the rearwardly extending side flanges 27 of brackets 28. The brackets 28 are disposed vertically with their lower ends riveted or otherwise firmly attached to the end portions of the upper plate 9. It will thus be seen that the shield will be of a strong construction and very securely mounted. The corrugations not only serve to direct the flow of water off of the shield but also strengthen it and prevent it from being easily bent by wind.

Instead of securing the frame to a hollow metal post by means of the clamps already described, there may be provided a wooden post 29. When this form of post is employed, the upper and lower angle bars 9 and 10 carry short brackets 30 which project rearwardly therefrom and are riveted or otherwise firmly secured to the upper and lower ends of a strip 31 formed of angle metal. The flange 32 of the angle metal strip 31 fits flat against the post 29 and is secured thereto by lag screws or other threaded fasteners 33. It will also be obvious that when the buildings upon a street follow a sidewalk along its inner margin, suitable brackets could be applied to the upper and lower angle bars 9 and 10 and these brackets attached to the wall of the building. It might also be found practicable to attach brackets to the building, including vertically disposed arms for engagement by the jaws 17. I have, therefore, provided mirrors which, when erected as shown in Figure 1, will be very effective in operation and prevent danger of a collision at a street intersection.

Having thus described the invention, what I claim is:

1. A traffic indicator comprising a frame having front and rear open bordering sheets, a rim of angle metal extending about said sheets and having portions extending between the sheets to limit movement of the sheets towards each other and portions projecting forwardly therefrom, a signal in said frame having marginal portions extending between the bordering sheets and enclosed by the inwardly extending portions of said rim, fasteners passed through the bordering sheets and rim to retain the sheets in holding relation to the signal, and mounting means connected with the forwardly extending portions of said rim and projecting rearwardly from the frame for engagement with a support.

2. A traffic indicator comprising a frame having a marginal rim projecting forwardly therefrom, indicating means in said frame, angle bars extending transversely above and below said frame and having horizontal portions secured to said rim and vertical portions, and mounting means secured to the vertical portions of said angle bars and projecting rearwardly therefrom and adapted to be secured to a support.

3. A traffic indicator comprising a frame having a marginal rim projecting forwardly therefrom, indicating means in said frame, angle bars extending transversely above and below said frame and having horizontal portions secured to said rim and vertical portions, and clamps secured to the vertical portions of said angle bars and projecting rearwardly therefrom and having jaws adapted to be disposed about a support in tight gripping engagement therewith.

4. A traffic indicator comprising a frame having a marginal rim projecting forwardly therefrom, indicating means in said frame, angle bars extending transversely above and below said frame and having horizontal portions secured to said rim and vertical portions, brackets secured to the angle bars and projecting rearwardly therefrom, and a vertically disposed angle bar extending between and secured to said brackets and adapted to be secured to a support.

5. A traffic indicator comprising a frame having a marginal rim projecting forwardly therefrom, indicating means in said frame, angle bars extending transversely above and below said frame and having horizontal portions secured to said rim and vertical portions, mounting means secured to the angle bars and projecting rearwardly therefrom and adapted to be secured to a support, brackets carried by the upper angle bar and projecting upwardly therefrom adjacent its ends, and a shield secured to said brackets and projecting forwardly over the frame and beyond the same.

In testimony whereof I affix my signature.

HERMAN A. SEUME. [L. S.]